United States Patent Office 3,122,438
Patented Feb. 25, 1964

3,122,438
PHOTOSENSITIVE COMBINATION OF CELLULOSE WITH A HYDROPHOBIC DYE CYANIDE AND PROCESS FOR MAKING IT
Lyman Chalkley, Prince Georges County, Md.
(5320 Middleton Lane, Washington 31, D.C.)
No Drawing. Filed Oct. 3, 1960, Ser. No. 59,826
8 Claims. (Cl. 96—90)

This invention relates to photosenstive materials and more particularly to a photosensitive combination of cellulose with a hydrophobic dye cyanide and process for making it.

This application is a continuation of my copending application Serial No. 712,622, filed February 3, 1958, and now abandoned.

It is known that the hydrophobic cyanides of triphenylmethane dyes become photosensitive when combined with suitable photoactivators, such as certain nitriles, aromatic amines and aromatic carbinols; and that these photosensitive combinations may be applied to paper, film, glass, etc., to provide photographic printing materials. When the photoactivator is removed from such materials the original photosensitivity is lost, leaving an image (if the material has previously been printed upon) that is fixed, as described in U.S. Patent No. 2,844,465.

The loss in photosensitivity takes place when the photoactivator is evaporated from a mixture of dye cyanide and photoactivator applied to cellulosic material, such as paper or cloth. Thus the cellulose does not act as a photoactivator for the dye cyanide deposited on it in this way. However, hydrophilic dye cyanides, in sharp contrast to the hydrophobic dye cyanides, readily form photosensitive systems with cellulose, as described in U.S. Patent No. 2,855,303.

A method has now been found for producing a new type of combination of cellulose with hydrophobic dye cyanides which is photosensitive. By this method the hydrophobic dye cyanide is carried in solution into the ordered, or micellar, structure of the cellulose and deposited there in a photosensitive form. In order to make the photosensitive product it is necessary to use as a solvent for the hydrophobic dye cyanide a liquid that has the ability to penetrate into the cellulose micelles or crystals. Such solvents are organic intramicellar or intracrystalline swelling agents for cellulose, and will be referred to as intracrystalline swelling agents.

Among organic intracrystalline swelling agents are aliphatic amines, lower aliphatic acids such as formic and acetic, carboxylic acid amides and dimethyl sulfoxide. Some of the intracrystalline swelling agents merely penetrate the cellulose micelles without forming definite compounds with the cellulose. Others appear to form definite chemical combinations, known as swelling compounds, with the cellulose. Both types may be used to produce photosensitized cellulose. But because the solvent is to be removed to form the finished product, those solvents, like ethylene diamine, that form the more stable swelling compounds are more troublesome to work with than those, like n-butyl amine, that form less stable swelling compounds, or those, like acetic acid, that do not form swelling compounds.

The organic intracrystalline swelling agents include substances, such as the lower aliphatic acids and their amides, that are photoactivators for the hydrophobic dye cyanides, and also substances, such as the aliphatic amines, that dissolve hydrophobic dye cyanides to form solutions that do not produce color on exposure to ultraviolet. In either case the solvent is removed and is not present in the finished photosensitive cellulose preparation. Previously known photosensitive hydrophobic dye cyanide materials using a cellulose support have all been photoactivated by an additional non-cellulosic photoactivator, which is not present in the new products.

The quantitative relationships are exemplified by the following experiment:

EXPERIMENT 1

A 3" x 6" sheet of 20 lb. basis weight filter paper after drying ½ hour at 100° C. in vacuo over phosphorous pentoxide weighed 0.7411 g. The paper was wet with a solution of 0.0100 g. of Malachite Green cyanide in 1 ml. of glacial acetic acid, and dried in a stream of air at 20° C. for 10 hours, when it no longer had any odor of acetic acid. The paper was then freed of moisture by drying ½ hour at 100° C. in vacuo over phosphorous pentoxide. It then weighed 0.7512 g., which, within the precision of the weighing (0.1 mg.) was the weight of only the original dry paper and the dye cyanide. No acetic acid or other non-cellulosic photoactivator remained in the paper. The dried paper was strongly photosensitive.

The contrast in properties between a paper sensitized by the new process used in Experiment 1 and a paper on which dye cyanide has been deposited from a solvent that is not an intracrystalline swelling agent is illustrated by the following experiment:

EXPERIMENT 2

A 3" x 6" strip of the same filter paper used in Experiment 1 was wet with a solution of 0.0100 g. of Malachite Green cyanide in toluene and the toluene evaporated to give a paper having the same concentration of Malachite Green cyanide as that prepared in Experiment 1. The dried product made by use of toluene is referred to as paper No. 2.

The paper prepared in Experiment 1 was exposed at 13" from a 15 watt germicidal lamp for 30 seconds to print out a light green image. Paper No. 2 was exposed to the same lamp at the same distance for 3000 seconds (50 minutes), i.e., for 100 times the exposure given the first paper, but paper No. 2 did not print out as strong an image as the 30 second exposure produced on the paper prepared in Experiment 1.

The printing times used in Experiment 2 were arbitrarily chosen so as to supply a simple minimum quantitative comparison between the new cellulose photoactivated materials and papers in which a hydrophobic dye cyanide had been deposited from a solvent that is not an intracrystalline swelling agent. On an absolute basis the new materials are at least as sensitive to ultraviolet as any previous photosensitive preparations of either hydrophobic or hydrophilic dye cyanides, while papers impregnated with hydrophobic dye cyanides deposited from solvents that are not intracrystalline swelling agents do not have a useful sensitivity. The insensitivity of papers in which hydrophobic dye cyanides have been deposited from a variety of photoactivating solvents that are not intracrystalline swelling agents has already been referred to in U.S. Patent No. 2,844,465.

Thus the photosensitive cellulose represents a new intramicellar combination of cellulose with a hydrophobic dye cyanide rather than a mere deposit of dye cyanide on the cellulose fibers or particles.

The new photosensitive cellulose preparations have a number of advantages over previously known dye cyanide sensitized materials. They are more stable than hydrophobic dye cyanide materials prepared with previously known photoactivators. Their sensitivity is not impared by vapor loss. The images formed are very sharp and remain sharp without diffusing in the paper or cloth as do images on other hydrophobic dye cyanide sensitized materials. The sensitizer is firmly held within the cellulose and cannot be washed away by familiar dye cyanide solvents, such as toluene; whereas papers photoactivated as in Example 11 of U.S. Patent No. 2,676,887 or with N-methyl acetamide or hexanamide as disclosed in U.S. Patent No. 2,936,235 are desensitized by such treatment.

In general the new process makes it possible to obtain from the cheap and easily prepared hydrophobic dye cyanides materials with most of the advantages heretofore available only through the use of the more expensive and difficultly prepared hydrophilic dye cyanides.

Hydrophobic dye cyanides are used to sensitize cellulose by the new process. These are para amino triarylacetonitriles that do not contain hydrophilic or additional salt forming groups. Examples are Malachite Green cyanide (4,4'-bis-dimethylamino-triphenylacetonitrile), Brilliant Green cyanide (4,4'-bis-diethylamino-triphenylacetonitrile), Setoglaucine cyanide (4,4'-bis-dimethylamino-2''-chloro-triphenylacetonitrile, described in U.S. Patent No. 2,877,166), p-Rosaniline cyanide (4,4',4''-triamino-triphenylacetonitrile), Rosaniline cyanide (a mixture containing largely 4,4',4''-triamino-3-methyl-triphenylacetonitrile), New Fuchsine cyanide (4,4',4''-triamino-3,3',3''-trimethyltriphenylacetonitrile, described in U.S. Patent No. 2,829,149) and Crystal Violet cyanide (4,4',4''-tris-dimethylamino - triphenylacetonitrile). Dye cyanides may be used individually or in combination with each other.

Cotton, paper from wood pulp, and cellulose derived from these and similar sources are suitable for sensitizing by the new process.

The organic intracrystalline swelling agent solvents employed in the subsequent examples include n-propyl amine, n-butyl amine, n-hexyl amine, beta-ethanolamine, acetic acid, dimethyl sulfoxide, formamide, dimethyl formamide, methyl acetamide, dimethyl acetamide. Cellulose may also be sensitized with solutions of hydrophobic dye cyanides in other organic intracrystalline swelling agent solvents known to cellulose chemists. Volatile organic intracrystalline swelling agents are employed so that they may be removed by evaporation.

The intracrystalline swelling agent solvents may be used individually or, where chemically compatible, in mixture with each other. Also they may advantageously be used in mixture with non-swelling agent solvents in order to reduce viscosity, or to extend the swelling agent solvent, or to reduce the time required for subsequent removal of the solvent. In such use it should be kept in mind that intracrystalline swelling depends not only upon the chemical nature of the swelling agent but often upon its concentration, and in a mixed solvent the concentration of the swelling agent should be kept high enough to cause penetration of the cellulose micelles.

Application of the dye cyanide solution to the cellulosic material can generally be carried out at or near room temperature. The penetration of the cellulose is satisfactorily rapid at such temperature. Where the solubility of the dye cyanide in the intracrystalline swelling agent solvent is too low at room temperature, or the viscosity of the solution is too high, elevated temperatures may be used. In general it is desirable not to exceed about 100° C. Solutions in very volatile solvents, such as the lower aliphatic amines may be applied to the cellulosic material in a closed system to prevent excessive evaporation before the cellulose has been wet and penetrated. In general, penetration of paper and cotton takes place within a minute or two and usually as rapidly as the material is wet by the solution.

Before sensitization the cellulosic material does not need to be especially dried. The careful drying in Experiment 1 was performed in order to obtain a constant weight and not because it was necessary for preparation of a sensitized product. Paper that has been stored in air having a relative humidity of 50% or less may be sensitized without additional drying.

After the cellulosic material has been wet by the solution of the dye cyanide in the intracrystalline swelling agent solvent, or mixed solvent, the solvent is removed, preferably by evaporation. Evaporation is most conveniently carried out by a stream of air. It may be performed at room temperature, though it is more rapid at somewhat higher temperatures. Temperatures between 40° and 70° C. have been found very satisfactory, and higher temperatures may be used, although temperatures much above 100° C. are less desirable because of some decomposition they may cause in the materials. Air used in the evaporation should be dry enough to prevent the condensation of liquid water upon the sensitized materials, and should preferably have a relative humidity of 50% or less. Humid conditions are to be avoided.

The solvents may be evaporated under other conditions, e.g., in vacuo, or over reagents that react with the solvent. Thus acetic acid treated materials may be dried in a desiccator over caustic soda, and amine treated materials in a desiccator over sulfuric acid.

Because of the convenience of removing the solvent by vaporization or evaporation it is desirable to use volatile intracrystalline swelling agents. A volatile intracrystalline swelling agent solvent is considered to be one that develops a vapor pressure of 76 cm. of mercury at 300° C. or a lower temperature.

As is well known, in presence of alkaline agents, such as amines, cellulose reacts with oxygen and with water to undergo oxidation and hydrolysis. Therefore, materials sensitized with an amine solution and air dried have, after removal of the amine, a weight somewhat greater than that of the original cellulosic material plus the added dye cyanide. Quantitatively the effect is not constant and varies with the conditions of drying, etc., but may be illustrated by the following experiment:

EXPERIMENT 3

A 3" x 6" piece of 20 lb. basis weight filter paper after drying ½ hour at 100° C. over phosphorous pentoxide weighed 0.7503 g. It was wet with a solution of 0.0100 g. of New Fuchsine cyanide in 1 ml. of N-butyl amine. The solution of the New Fuchsine cyanide developed no color on irradiation with an S4 sunlamp. The wet paper also failed to color on exposure to the mercury lamp. The paper was air dried at 50° C. As the amine evaporated the paper slowly became photosensitive. The air dried paper was further dried for ½ hour at 100° over phosphorous pentoxide. It weighed 0.7728 g., a gain of 0.0225 g. over the weight of the original untreated paper, and of 0.0125 g. over the combined weight of the original paper and dye cyanide. The paper was fully photosensitive.

Because the presence of free amine inhibits the photocoloration of sensitized cellulose, the development of maximum photosensitivity is an indication of effective removal of the amine. Amine held in the form of a salt of any acid present in the cellulose does no harm.

While much less strongly alkaline than the amines, some of the amides are slightly alkaline, and may cause a slight increase in weight of cellulosic materials treated with them and then air dried. For example, such treatment of paper with dimethyl formamide may cause an increase in weight of 1 to 2 parts per 1000, as shown by Experiment 4.

EXPERIMENT 4

A 3" x 6" strip of filter paper was dried in a vacuo at 100° C. over phosphorus pentoxide for ½ hour. It then weighed 0.7492 g. It was wet with a solution of 0.0100 g. of p-Rosaniline cyanide in 1 ml. of dimethyl formamide, hung for 24 hours in a stream of air at 17° C. and residual moisture removed by drying in vacuo at 100° C. over phosphorous pentoxide for ½ hour. The treated paper weighed 0.7603 g., showing a gain of 0.0011 g. over the combined weight of the original paper and dye cyanide, or 0.15 of 1% of the weight of the untreated paper.

In sheet materials the concentration of dye cyanide lies preferably between 0.01 milligram and 2 milligrams per square inch of area of the paper, cloth, or similar material. Lower concentrations give materials that do not print out strong images, while the increased printing speed and depth of image obtainable on materials sensitized with more than 2 milligrams of dye cyanide per square inch usually do not justify the increased cost. Cellulose pulp and loose fibers to be incorporated into plastics or otherwise processed after sensitizing preferably have a concentration of dye cyanide ranging from $1/1000$ to $1/5$ of the weight of the cellulose.

The concentration of the dye cyanide in the solution used for sensitizing the cellulosic material should be adjusted to give the concentrations indicated above in the final product, and varies somewhat with weight, viscosity and wetting power of the solvent for the material being treated. It will usually fall in the range of 0.05 milligram to 40 milligrams of dye cyanide per milliliter of solvent. If the proportion of ordered cellulose in a material is low concentrations may have to be increased to give adequate sensitization.

The invention will be illustrated further by the following examples. In them all sensitization operations should be carried out in absence of ultraviolet radiation.

*Example 1*

Filter paper, 20 lb. basis weight, is wet with an n-propyl amine solution containing 10 mg. of Malachite Green cyanide per ml. One ml. of solution is used to wet 10 sq. inch of paper. To insure uniform wetting, the paper is kept in a closed glass container for 10 minutes at room temperature, and then dried in a free stream of dry air heated to 55° C. for a least six hours and until all odor of amine has been lost.

While moist the paper does not develop a color on exposure to ultraviolet radiation, but after complete drying it prints out a strong green color on irradiation with ultraviolet.

*Example 2*

One volume of n-butyl amine is mixed with one volume of a freshly prepared acetonitrile solution of p-Rosaniline cyanide containing 1 g. of dye cyanide in 100 ml. The solution of p-Rosaniline cyanide inacetonitrile is not indefinitely stable at low temperatures, e.g. 20° C., because of slow crystallization of the dye cyanide. The solution therefore should be either stored at a higher temperature or freshly prepared.

Filter paper wet at 25° C. with the mixed amine solution and dried in a draft of air heated to 55° C. for four hours, or until the odor of amine has been completely lost. The moist paper does not color on exposure to ultraviolet, but the completely dry paper prints out a strong red image.

*Example 3*

Equal volumes of n-hexyl amine and of an acetonitrile solution containing 1 g. of p-Rosaniline cyanide in 100 ml. are mixed at room temperature and filter paper wet with this mixture. The moist filter paper does not color on exposure to ultraviolet. It is dried in a stream of air heated to 60° C. for 6 hours or until all smell of amine has been lost. The dry paper prints out a strong red image on irradiation with ultraviolet.

*Example 4*

Filter paper is wet at room temperature with a mixture of equal volumes of beta-ethanol amine and a solution of 1 g. of p-Rosaniline cyanide in acetonitrile. The moist paper does not color on irradiation with ultraviolet. It is dried for 3 hours in a stream of air heated to 55° C., and then for three days in air at room temperature. The paper then prints out a strong red image.

*Example 5*

Filter paper is wet at room temperature with a solution of 0.3 g. of Crystal Violet cyanide in 100 ml. of dimethyl formamide, using 1 ml. of solution to 18 sq. in. of paper. Because of the viscosity of the formamide about 5 minutes is required at 20° C. for the solution to spread evenly over the paper. The moist paper is photosensitive but prints an image that is unsharp and becomes very diffuse on standing. The paper is dried for 16 hours in a stream of air heated to 55°, when the dimethyl formamide will have been completely lost. The dry paper is fast printing and prints a strong permanently sharp violet image on exposure to ultraviolet.

*Example 6*

Filter paper is wet with a fresh solution of 1 g. of Setoglaucine cyanide, prepared as described in U.S. Patent No. 2,877,166 in 100 ml. of glacial acetic acid, using 1 ml. of solution for each 18 sq. in. of paper. The paper is dried for 4 hours in a stream of air heated to 55° C. The odor of acetic acid will then have been completely lost. The dried paper is strongly photosensitive and an exposure to ultraviolet prints out a strong, permanently sharp green image.

*Example 7*

Water leaf paper is wet with n-butyl amine saturated at 15° C. with p-Rosaniline cyanide. The paper is dried for 4 hours in a stream of air heated to 65° C. The dry paper prints out a strong magenta image on irradiation with ultraviolet.

*Example 8*

Twenty grams of colorless cotton cloth is wet at 20° C. with 30 ml. of n-butyl amine saturated at 15° C. with p-Rosaniline cyanide. The cloth is dried at room temperature in a strong stream of air for 24 hours, when the amine will have evaporated and the cloth become strongly photosensitive.

*Example 9*

One hundred ml. of n-hexyl amine is warmed to 60° C. and stirred for two hours with 1 g. of finely powdered New Fuchsine cyanide, the mixture cooled to 20° C. and filtered after standing for 3 days at this temperature to provide as filtrate a clear saturated solution of New Fuchsine cyanide. Water leaf paper is wet with this solution and dried for 48 hours at 25° in a strong stream of air. The solution of New Fuchsine cyanide and the paper while wet with this solution develop no color on exposure to ultraviolet radiation, but the dried paper prints out a strong magenta color on exposure.

*Example 10*

Ten g. of colorless cotton cloth is wet with 15 ml. of the saturated n-hexyl amine solution of New Fuchsine cyanide prepared in Example 9 and dried for 48 hours at 25° C. in a strong stream of air. The wet cloth does not color on irradiation, but after drying it prints out a deep magenta image on exposure to ultraviolet.

*Example 11*

Thirty square inches of cotton broadcloth weighing about 2 g. is wet with a solution of 0.01 g. of Malachite Green cyanide in 3 ml. of acetic acid and dried at room temperature in a stream of air for 24 hours. The cloth is then free of acetic acid and strongly photosensitive.

*Example 12*

Twenty grams of colorless cotton cloth is wet with a solution of 50 mg. of p-Rosaniline cyanide in 20 ml. of dimethyl formamide, and dried at room temperature in a strong stream of air for 24 hours, when the dimethyl formamide is completely removed. The dry cloth prints out a strong permanently sharp magenta image on exposure to ultraviolet.

*Example 13*

A solution of 0.1 g. of New Fuchsine cyanide in a mixture of 3 ml. of dimethyl sulfoxide and 7 ml. of toluene is sprayed evenly over 200 square inches of water leaf paper and the paper thoroughly dried at 45° C. in a stream of air. The dry paper prints out a strong, permanently sharp magenta image on exposure to ultraviolet. The paper may also be sensitized with an invisible design by spraying the sensitizer through a stencil. The dried paper will print out the sensitized design in bright magenta color on uniform exposure to ultraviolet.

*Example 14*

Twenty pound basis weight water leaf paper is impregnated with a solution of 5 g. of p-Rosaniline cyanide in 50 ml. of toluene, 50 ml. of acetonitrile and 100 ml. of molten N-methylacetamide. On drying for 10 minutes in a stream of air at 20° C. the toluene and acetonitrile are eliminated, leaving a paper that is strongly photosensitive but that is oily to the touch, that is desensitized by washing with toluene and that prints out a magenta image that is not sharp, diffuses in the paper and offsets to any other paper or absorbent material the print may come into contact with. The paper is further dried in a stream of air at 30° C. for 48 hours to remove completely the methylacetamide. The paper dried in this way is still strongly photosensitive but is not oily and prints a sharp image that does not diffuse or offset onto other papers or absorbent material with which the print may come into contact.

*Example 15*

Water leaf paper is impregnated with a solution made by dissolving 1 g. of Rosaniline cyanide in 100 ml. of formamide and diluting the solution with an equal volume of methyl alcohol. When the methyl alcohol is evaporated by exposure of the wet paper to a stream of dry air for a few minutes the paper is strongly photosensitive but wet, hygroscopic so that it has to be carefully protected from moisture, and prints an image that is unsharp, diffuses over the paper in a few hour after printing, and offsets to other paper or material that the print may come into contact with. The paper is further dried for 1 week in a stream of dry air at 20° to remove the formamide. The final product is dry, no more hygroscopic than ordinary paper, does not need to be kept in a closed container, is strongly photosensitive and prints an image that is sharp and remains sharp permanently and does not offset to other paper or material with which the print may come into contact.

*Example 16*

Water leaf paper is impregnated with a solution of 2 g. of Setoglaucine cyanide in a mixture of 100 ml. of dimethyl acetamide and 500 ml. of acetonitrile, and air dried not only to the removal of the acetonitrile but also to the complete removal of the dimethyl acetamide. The resulting product is dry, strongly photosensitive and prints out a sharp green image that remains sharp permanently.

*Example 17*

Paper may be both sensitized and sized in a single operation as follows: Water leaf paper is coated on both sides with a mixture of equal volumes of a solution of 4 g. of corn-starch in 100 ml. of formamide and a solution of 1 g. of p-Rosaniline cyanide in 100 ml. of dimethyl formamide. The paper is dried in a stream of air at 30° C. for 48 hours. The resulting product is strongly photosensitive and lightly sized.

*Example 18*

Paper may be sensitized after sizing. Paper with a hydrogenated rosin internal size and starch surface size is evenly wet with a solution of 1 g. of p-Rosaniline cyanide in 15 ml. of dimethyl formamide and 25 ml. of acetonitrile. The paper is then dried in a stream of air at 55° C. to complete removal of the solvent. The paper is strongly photosensitive and is sensitized on both sides.

I claim:
1. The process of preparing a photographic element by effecting an intramicellar combination of cellulose with a hydrophobic dye cyanide consisting in the steps of wetting cellulose with a solution of a hydrophobic triarylmethane dye cyanide in a volatile organic intracrystalline swelling agent for cellulose followed by the step of removing completely said intracrystalline swelling agent by evaporation.

2. The product produced by the process of claim 1.

3. The process of preparing a photographic element by effecting an intramicellar combination of cellulose with a hydrophobic dye cyanide consisting in the steps of wetting cellulose with a solution of a hydrophobic triarylmethane dye cyanide chosen from the group consisting of 4,4'-bis-dimethylamino triphenylacetonitrile, 4,4'-bis-diethyl-amino-triphenylacetonitrile, 4,4'-bis-dimethylamino-2''-chloro-triphenylacetonitrile, 4,4',4''-triamino-triphenylacetonitrile, 4,4'4''-triamino-3-methyltriphenylacetonitrile, 4,4',4''-triamino 3,3',3''-trimethyl-triphenylacetonitrile, 4,4',4''-tris-dimethylamino-triphenylacetonitrile, in a volatile organic intracrystalline swelling agent for cellulose followed by the step of removing completely said intracrystalline swelling agent by evaporation.

4. The product produced by the process of claim 3.

5. The process of preparing a photographic element by effecting an intramicellar combination of cellulose with a hydrophobic dye cyanide consisting in the steps of wetting cellulose with a solution of a hydrophobic triarylmethane dye cyanide in a volatile organic intracrystalline swelling agent for cellulose chosen from the group consisting of aliphatic amine, aliphatic carboxylic acid amide, lower aliphatic carboxylic acid, dimethyl sulfoxide, followed by the step of removing completely said intracrystalline swelling agent by evaporation.

6. The product produced by the process of claim 5.

7. The process of preparing a photographic element by effecting an intramicellar combination of cellulose with a hydrophobic dye cyanide consisting in the steps of wetting cellulose with a solution of a hydrophobic triarylmethane dye cyanide chosen from the group consisting of 4,4'-bis-dimethylamino-triphenylacetonitrile,
4,4'-bis-diethylamino-triphenylacetonitrile,
4,4'-bis-dimethylamino-2''-chloro-triphenylacetonitrile,
4,4',4''-triamino-triphenylacetonitrile,
4,4',4''-triamino-3-methyl-triphenylacetonitrile,
4,4',4''-triamino-3',3''-trimethyl-triphenylacetonitrile,
4,4',4''-tris-dimethylamino-triphenylacetonitrile, in a volatile organic intracrystalline swelling agent for cellulose chosen from the group consisting of aliphatic amine, aliphatic carboxylic acid amide, lower aliphatic carboxylic acid, dimethyl sulfoxide, followed by the step of removing completely said intracrystalline swelling agent by evaporation.

8. The product produced by the process of claim 7.

References Cited in the file of this patent

UNITED STATES PATENTS

| | | |
|---|---|---|
| 2,528,496 | Chalkley | Nov. 7, 1950 |
| 2,829,052 | Chalkley | Apr. 1, 1958 |
| 2,936,235 | Chalkley | May 10, 1960 |